INVENTORS
WILLIAM H. LYKKEN
BY HENRY L. FREYSINGER
JAMES W. BERCAW

Moore, White & Burd
ATTORNEYS

United States Patent Office 3,326,475
Patented June 20, 1967

3,326,475
REJECT SPOUTS
William H. Lykken, Springfield, Henry L. Freysinger, Urbana, and James W. Bercaw, Springfield, Ohio, assignors to The Microcyclomat Co., Minneapolis, Minn., a corporation of Delaware
Filed June 1, 1964, Ser. No. 371,366
12 Claims. (Cl. 241—53)

This invention relates to specialized reject spouts for extraction apparatus and to the use of deflector means to control the discharge of extracted material. In the copending application Ser. No. 276,457 of William H. Lykken, filed Apr. 29, 1963, now Patent No. 3,221,998, issued Dec. 7, 1965, there is disclosed a pulverizer-classifier apparatus adapted for the separation and extraction of solid materials, one from another. The apparatus of that application is adapted, for example, to the separation of asbestos fibers from asbestos-bearing ores and the extraction of gangue and like contaminants from the fibers, extraction of contaminants from clay and talc and similar non-metallic minerals for the purpose of upgrading them, and the like.

In such an exemplary extraction apparatus the raw material feed is first deagglomerated and reduced by air attrition and impact as the particles are acted upon by a high speed rotor rotating in a cylindrical housing. At the same time the solid material is thoroughly diluted and dispersed in an air stream. The impact and air attrition action on the particles suspended in air has the effect of reducing the particles of material fed into the apparatus and physically separating the desired particles from any bonded impurities or contaminants. In most instances the impurities are more difficult to grind and thus are reduced in size to a lesser extent.

The mixture of reduced and thoroughly dispersed desired solid material and separated contaminants is subjected to simultaneous centripetal and centrifugal forces. The finer and lighter material, which is usually the desired material, is freed from the coarser and denser material, which is usually the contaminant, and is drawn centripetally inwardly from the mixed stream and discharged from the apparatus. The coarser and denser material is thrown centrifugally outwardly against the cylindrical wall of the apparatus housing and is discharged through one or more discharge or extraction conduits or reject spouts spaced about the wall of the classifier portion of the cylindrical housing.

In many instances it is difficult to accurately and sharply delineate between the finer and light material and the coarser and denser material. This is particularly true where the coarser, denser contaminating substances comprise only a relatively small part of the total materials. One result is that part of the finer and lighter material is discharged and rejected with the coarser and denser material.

It is the object of this invention to provide specialized reject spouts for extraction apparatus incorporating deflector means by which the retention time of part of the coarser and denser material in the classifier can be increased by deflecting the stream of coarser and denser particles away from the reject discharge opening.

It is accordingly a principal object of this invention to provide reject spouts for extraction apparatus provided with deflector means.

It is a further object of this invention to provide reject spouts for extraction apparatus having adjustable deflector means by which discharge of coarser and denser materials from an extraction apparatus can be regulated and controlled.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, of but a few of the various ways in which the principles of the invention may be employed.

The invention is illustrated by the accompanying drawings in which the same numerals refer to corresponding parts and in which.

Figure 1:
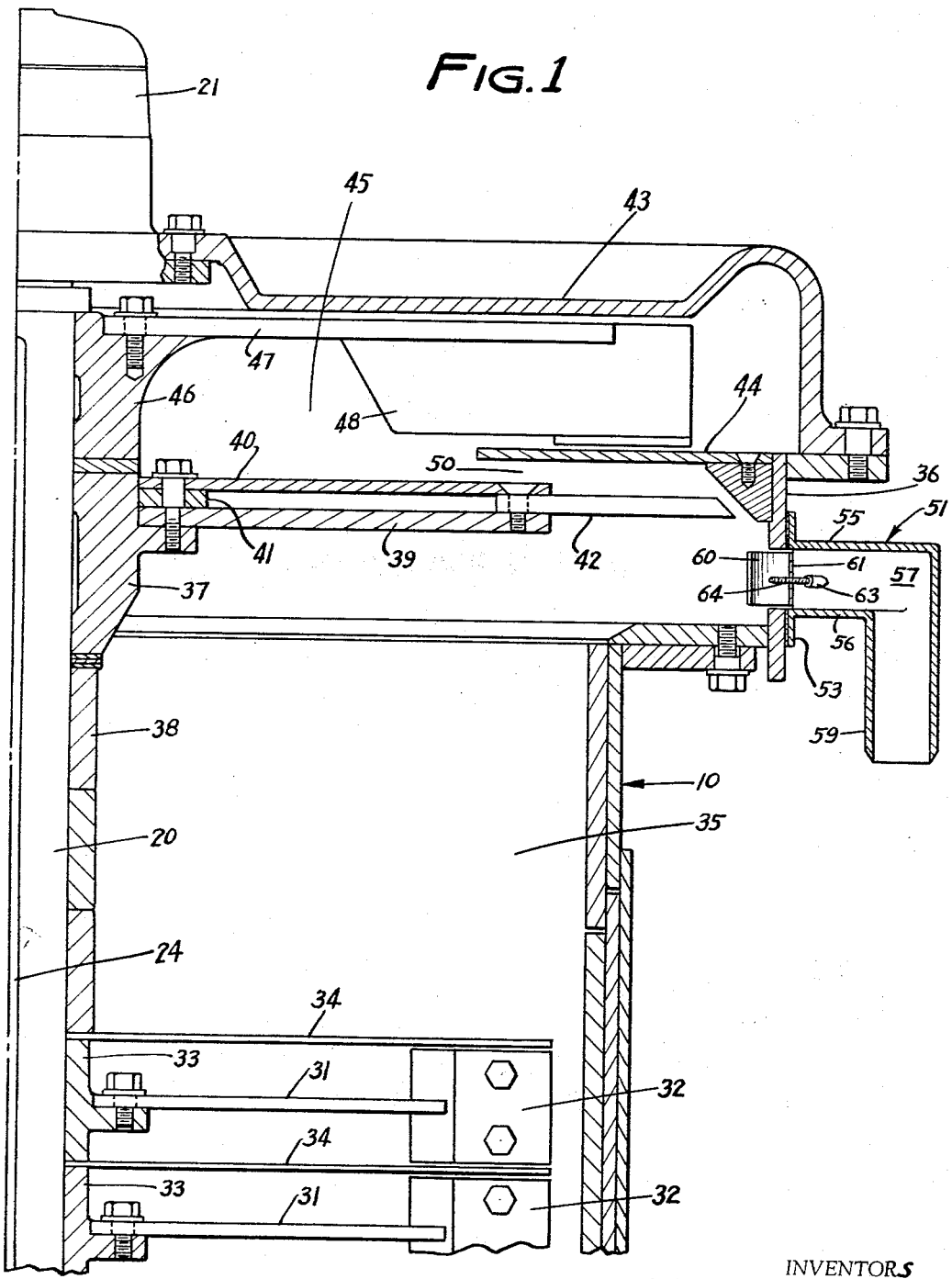
FIGURE 1 is a fragmentary elevation, in section, showing a portion of an extraction apparatus of the type with which the reject spouts of the present invention are adapted to be used, shown with one form of reject spout mounted in place in the wall of the classifier section of the extraction apparatus.

Referring to the drawings and particularly to FIGURE 1, the exemplary extraction apparatus comprises a cylindrical casing 10 which houses means for reducing and dispersing the material to be separated and extracted. As is well known, the casing is supported on a suitable base and the apparatus is provided with conventional drive means and a feed hopper to introduce material to be separated and extracted into the lower part of the casing.

The apparatus includes a shaft 20 journalled for rotation about a vertical axis centrally within casing 10. Shaft 20 is journalled in upper and lower bearings, of which only upper bearing 21 is shown. Shaft 20 is provided with a keyway 24 for attachment of rotor elements for rotation with the shaft. A plurality of hubs 33 are mounted on the shaft 20. Each hub 33 supports an annular plate 31 carrying spaced radial blades 32. Each rotor stage represented by an annular plate 31 and series of radial blades 32 is separated from the adjacent stages by an annular disk 34 supported on the rotor shaft between the hubs.

As is well known in the art, the several rotor stages act on the material fed into the lower portion of the casing 10 to reduce and deagglomerate the solid material by air attrition and impact between the particles and rotor blades and housing wall. At the same time the solid material is thoroughly diluted and dispersed in the air stream drawn in through an air inlet at the bottom of the apparatus. The material is acted upon in intrablade vortices between adjacent radial blades 32 spaced about the periphery of the rotor stages and in a rising vortex between the outer periphery of the rotor stages and the housing wall. The desired and valued particles are physically separated from any bonded impurities or contaminants and are generally reduced in size. The impurities are generally more difficult to grind and thus are ground to a lesser extent.

The mixture of reduced and thoroughly dispersed solid material and separated contaminants rises into the upper chamber 35 of the casing 10 and into the cylindrical classifying or extracting casing 36 mounted on top of the casing 10. A further hub 37 is positioned on shaft 20 for rotation therewith in cylindrical housing 36. Hub 37 is spaced from the reducing and dispersing rotor elements by means of a series of spacer rings or sleeves 38. Hub 37 supports a pair of annular plates 39 and 40 held spaced apart by means of a spacer ring 41. A plurality of finger-like radiating blades or rods 42 are supported between plates 39 and 40 at their outer periphery for rotation within cylindrical housing 36.

A fan housing 43 is disposed on top of the apparatus above the cylindrical classification housing 36. An annular diaphragm ring 44 is disposed between the classifier housing 36 and the fan housing 43. An annular opening 45 defined by the inner periphery of diaphragm ring 44 and the shaft hubs forms an opening communicating between the two housings.

A fan hub 46 is secured to shaft 20 for rotation therewith within fan housing 43. Hub 46 supports an annular plate 47 which in turn carries a plurality of spaced radial fan blades 48 at its outer periphery. Fan housing 43 is in the form of an involute scroll as is conventional in the art. The scroll housing terminates in a discharge port (not shown) which leads to a collector for receiving the material discharged from the apparatus. The fan functions to induce a flow of air and material through the apparatus and to discharge the lighter finer solid materials (which in most cases are the desired materials) separated from the original feed.

In order to get from the top zone 35 of the material reducing and dispersing housing, the finer and lighter material must first pass into classifier housing 36, where it is freed from the coarser and denser materials, and must pass between the finger-like blades or rods 42 and be drawn centripetally through the narrow passage 50 between the inner lip of diaphragm ring 44 and the outer lip of plate 40. The material which makes its way through passage 50 is then caught up and entrained in the stream of the fan blades and discharged out through conduit 49.

The coarser denser materials (which in most cases are the impurities or contaminants) which are rejected by the classifier rotor, are thrown centrifugally outwardly to the cylindrical wall of housing 36 and are caught by one of several coarse discharge or extraction conduits or reject spouts 51 spaced about the wall of the classifier housing 36. Each reject spout is mounted over and in communication with a passage 52 in the wall of classifier housing 36. The opposite end of each reject spout is fitted with a resilient flapper extraction or valve or is connected to a bleeder cyclone-type separator.

Figure 2:
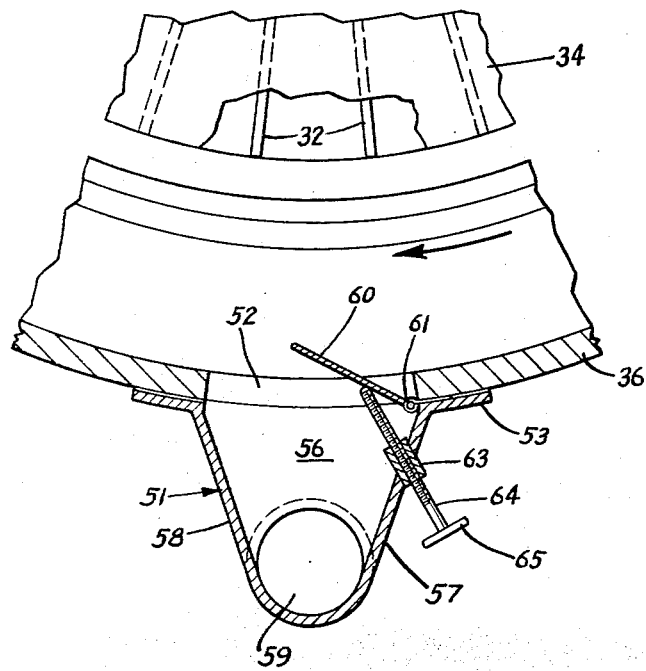
FIGURE 2 is a fragmentary horizontal section showing one form of reject spout mounted on an extraction apparatus.
Figure 3:
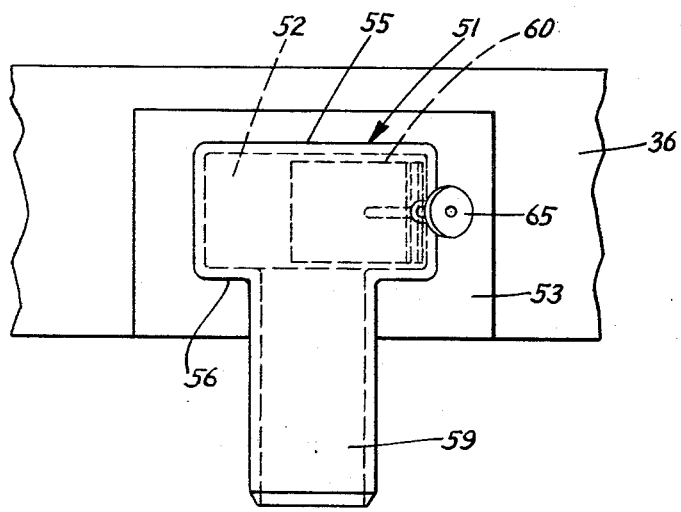
FIGURE 3 is an elevation of the reject spout of FIGURE 2.

Referring now to FIGURES 2 and 3, there is shown one form of reject spout assembly according to the present invention. This assembly comprises a plate 53 adapted to be secured to the outer cylindrical wall 36 of the classifier housing of an extraction apparatus. Plate 53 is provided with an opening of size and shape to fit over the discharge opening 52 in the wall 36. Extending out from plate 53 and over the opening is a housing comprised of a general horizontal top wall 55, a generally horizontal bottom wall 56 spaced therefrom and a pair of converging generally vertical side walls 57 and 58. The bottom wall 56 is intersected by a discharge conduit 59 at its outer end.

A deflector plate or blade 60 is disposed within the discharge opening 52 in the classifier housing wall 36. Deflector plate 60 has a width just slightly less than the height of opening 52 to permit the plate to be movable in the opening and a length preferably less than the length of opening 52. Deflector plate 60 is hinged at 61 for movement for adjustment of its angular relationship to the wall 36 and airborne stream of material circulating within wall 36. The deflector plate 60 is located with its free end extending in the direction of rotation of the rotor of the extraction apparatus, as indicated by the arrow in FIGURE 2.

In order to provide for adjustment and control of the angular position of deflector plate 60 there is provided a threaded sleeve 63 extending angularly through side wall 57 of the reject spout housing, about midway between the top and bottom walls thereof. An elongated screw 64 extends through the wall 57 through the threaded sleeve 63 and the inner end bears against the deflector plate 60. The force exerted by the circulating stream of airborne particles is sufficient to maintain the deflector plate constantly bearing against the end of the screw.

A turning knob 65 on the outside end of screw 64 permits the screw to be easily turned and the angular position of the deflector plate adjusted. The approximate position of the deflector plate can readily be determined by the distance between the end of sleeve 63 and knob 65. Where the precise location is critical a suitable graduated scale may be mounted on the screw assembly to indicate the precise angular location of the deflector blade. Where the apparatus is adapted to process a fairly homogeneous material under fairly constant conditions a fixed deflector may be used. In most cases adjustment is desirable.

As the air stream, in which the material particles from the grinding portion of the extraction apparatus are entrained, circulates around the outer periphery of the classification zone, the coarser and denser particles are thrown centrifugally outwardly and are carried along the inner surface of the wall 36. At the same time the finer and lighter particles are carried along an inwardly spaced circular path and are drawn centripetally inwardly through the passage 50 for discharge and collection. It is almost inevitable that some of the finer and lighter particles are thrown outwardly with the larger and denser particles. This may be because the finer and lighter particles are agglomerated together, or adhere to larger particles, or the like. The longer the materials are permitted to circulate in the classification zone the more sharp is the separation between the circulating streams of finer and coarser particles.

In the absence of the deflector blade 60, the coarsest material moving along the housing wall 36 is discharged outwardly through the opening 52 into the reject spout, carrying with it any adhering or agglomerated fine material. Because of the interposition of the deflector plate 60 into the path of the coarsest and densest material moving along the housing wall, the flow of this material is interrupted and a portion of it is deflected deeper into the circulating air stream for longer retention in the classifier zone. Only the very coarsest and densest material moves along the surface of the deflector and then passes around the end of the deflector into the reject spout for discharge. In this manner it is possible to regulate and control more closely the material which is rejected. By varying the angle at which the deflector plate is disposed relative to the housing wall more or less material as desired may be withdrawn through the reject spout.

Figure 4:
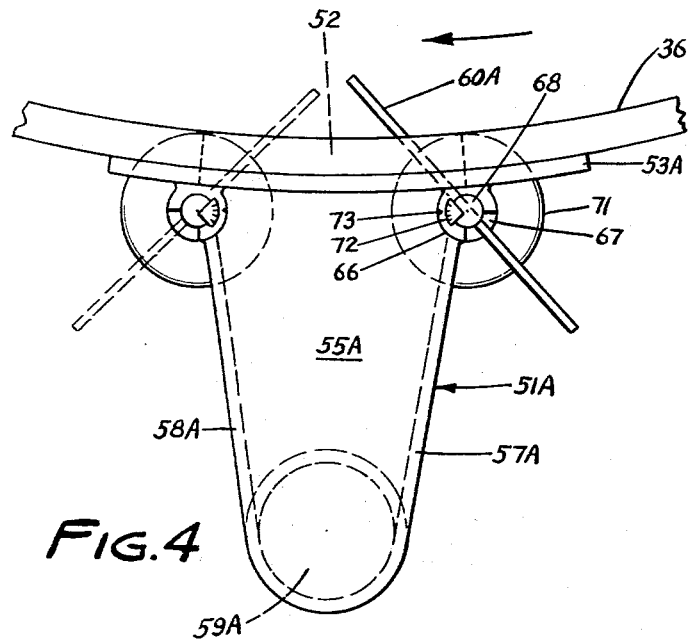
FIGURE 4 is a fragmentary top plan view of a modified form of reject spout.
Figure 6:
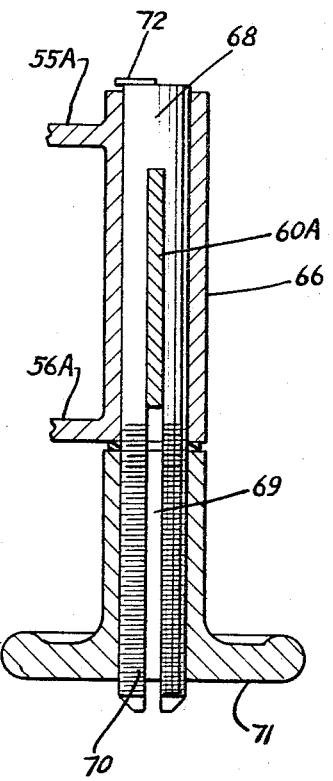
FIGURE 6 is an enlarged fragmentary vertical section showing the details of construction of the means for adjusting the depth and angle of the deflection means of the reject spout of FIGURE 4.
Figure 5:
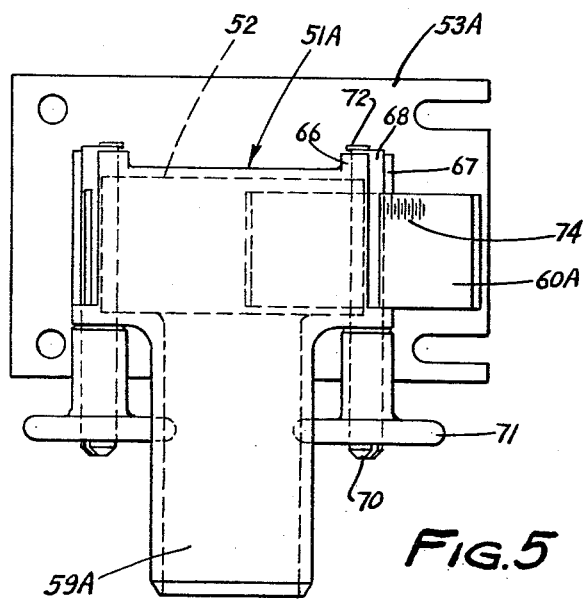
FIGURE 5 is an elevation of the reject spout of FIGURE 4.

Referring to FIGURES 4, 5 and 6, there is shown a modified form of reject spout with deflector plate. This modified reject spout 51A likewise includes a plate 53A adapted to be secured to classifier housing wall 36. Plate 53A likewise has a central opening adapted to be fit over the discharge opening 52 in the wall 36. The reject spout 51A includes a housing having spaced apart generally horizontal top and bottom walls 55A and 56A and converging side walls 57A and 58A. The housing is disposed over the opening 52. A discharge conduit 59A intersects the bottom wall 56A of the housing adjacent its outer end.

A vertical tubular sleeve 66 is provided adjacent the point of intersection of side wall 51A and plate 53A. Sleeve 66 is provided with a pair of opposed slot openings 67, the inner opening extending into the reject spout housing. A shaft 68 is fitted in sleeve 66 for limited rotation therein. Shaft 68 is provided with a transverse slot in at least that portion of its length which lies immediately adjacent the reject spout housing and slots 67. Deflector plate or blade 60A is inserted through slots 67 in sleeve 66 and through slot 69 in shaft 68.

The lower end of slotted shaft 68 is threaded at 70 and provided with a threaded knob 71. By tightening knob 71, the position of the deflector blade 60A is fixed. By loosening knob 71, shaft 68 may be rotated slightly and the angular relationship of the deflector to the wall 36 may be varied.

The slots 67 in sleeve 66 are desirably wide enough to permit a variation of from about 45 to 90°. In order that the angular position of deflector blade 60A may be precisely determined, a graduated scale 72 is desirably provided, fixed to the end of slotted shaft 68 and movable with respect to a fixed indicator or pointer 73 on the end of sleeve 66.

While knob 71 is loosened, the effective length of deflector blade 60A may be lengthened or shortened by moving the plate longitudinally through the slot 69 and slots 67. Blade 60A is desirably provided with graduations 74.

Deflector blade 60A functions in precisely the same manner as already described. Because of the greater degree of adjustment of deflector 60A, more precise control over the composition of the coarser and denser fraction of particles to be rejected may be exercised.

The reject spout 51A may optionally be provided with means for supporting a deflector blade or plate on the opposite end of the discharge opening 52, as shown in broken lines on FIGURE 4. This blade supporting structure is of the same construction as already described. When a blade is located in this position, in which the free inner end of the blade extends in a direction generally opposite to the direction of rotation of the rotor of the extraction apparatus, then it functions as a skimmer. When used in this manner the coarser and denser particles moving along the inner surface of the housing wall 36 are positively deflected into the reject spout housing having for quick discharge from the apparatus.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A reject spout for use in a cylindrical vertical axis centrifugal discharge extraction apparatus, said spout including means for attachment to the outside cylindrical wall of an extraction apparatus, a projecting housing, one end of said housing including an opening adapted to fit over and communicate directly with a discharge opening in the cylindrical wall of the extraction apparatus, a discharge conduit communicating with the opposite end of said housing, generally vertical deflector means disposed within said opening in said housing and extending from one vertical side wall of said housing adjacent its point of attachment to the means for attachment of the housing to the cylindrical wall of the extraction apparatus, said deflector means comprising a plate extending angularly inwardly relative to the cylindrical wall of the extraction apparatus and in the direction of rotation of the centrifugal throw-out rotor of said extraction apparatus.

2. A reject spout according to claim 1 further characterized in that said deflector means is mounted for pivotal movement for variation of its angular relationship to the wall of the extraction apparatus.

3. A reject spout according to claim 1 further characterized in that said housing includes vertically spaced generally horizontal top and bottom walls and converging side walls extending away from the means of attachment to the extraction apparatus, and a discharge conduit intersecting said bottom wall adjacent the outer end thereof.

4. A reject spout according to claim 2 further characterized in that said deflector means is hinged at one end adjacent its point of attachment to said projecting housing and means are provided for moving the deflector means on its hinge from external of said housing to vary the angular position of the deflector means.

5. A reject spout according to claim 4 further characterized in that said means for moving the deflector means comprises a threaded sleeve extending through the side wall of said housing, a threaded screw extending through said sleeve, its inner end contacting the outer surface of said deflector means, and knob means external of said housing to rotate said screw.

6. A reject spout for use in a cylindrical vertical axis centrifugal discharge extraction apparatus, said spout including means for attachment to the outside cylindrical wall of an extraction apparatus, a projecting housing, one end of said housing including an opening adapted to fit over and communicate directly with a discharge opening in the cylindrical wall of the extraction apparatus, a discharge conduit communicating with the opposite end of said housing, generally vertical deflector means disposed within said opening in said housing and extending from one vertical side wall of said housing adjacent its point of attachment to the means for attachment of the housing to the cylindrical wall of the extraction apparatus, said deflector means comprising a plate extending angularly inwardly relative to the cylindrical wall of the extraction apparatus and in the direction of rotation of the centrifugal throw-out rotor of said extraction apparatus, said deflector means being slidably and rotatably mounted adjacent the point of attachment of one vertical side wall of the reject spout housing to the means for attachment of the housing to the cylindrical wall of the extraction apparatus for longitudinal movement for variation of its depth of penetration into the extraction apparatus and for pivotal movement for variation of its angular relationship to the wall of the extraction apparatus and means for moving the deflector means from external of said housing to vary the angular position and depth of the deflector means.

7. A reject spout according to claim 6 further characterized in that said means for moving the deflector means comprises a slotted sleeve in the side wall of the reject spout housing, a slotted shaft positioned in said sleeve for limited rotation, said deflector means comprising a flat elongated plate extending through the slots in said shaft and said sleeve, said shaft being externally threaded on one end extending from said sleeve and internally threaded knob means on said shaft for adjusting the tension upon and for rotating said shaft.

8. A reject spout according to claim 7 further characterized in that the top of said shaft and the top of said sleeve are provided with a graduated scale and a cooperating indicator to visually indicate the angular position of said deflector means and said deflector means is provided with a graduated scale to visually indicate the depth of penetration of said deflector means.

9. A reject spout for use in a cylindrical vertical axis centrifugal discharge extraction apparatus, said spout including means for attachment to the outside cylindrical wall of the extraction apparatus, a projecting housing, one end of said housing including an opening adapted to fit over and communicate directly with a discharge opening in the cylindrical wall of the extraction apparatus, a discharge conduit communicating with the opposite end of said housing, a vertical slotted sleeve in the side wall of the housing adjacent the point of attachment of that side wall to the means for attachment of the housing to the cylindrical wall of the extraction apparatus, a slotted shaft positioned in said sleeve for limited rotation, generally vertical deflector means comprising a flat elongated plate extending through the slots in said shaft and said sleeve for slidable movement therein and into the opening in the end of said housing, said shaft being externally threaded on one end extending from said sleeve and internally threaded knob means on said shaft for adjusting the tension upon and for rotating said shaft.

10. A reject spout according to claim 9 further characterized in that the top of said shaft and the top of said sleeve are provided with a graduated scale and a cooperating indicator to visually indicate the angular position of said deflector means and said deflector means is provided with a graduated scale to visually indicate the depth of penetration of said deflector means.

11. A reject spout for use in a cylindrical vertical axis centrifugal discharge extraction apparatus, said spout including a projecting housing, means for attachment of the housing to the outside cylindrical wall of the extraction apparatus, one end of said housing including an opening adapted to fit over and communicate with a discharge opening in said extraction apparatus, a discharge conduit communicating with the opposite end of said housing, generally vertical deflector means disposed within said opening in said housing and comprising a plate hinged at one end adjacent the point of attachment of one vertical side wall of the housing to the means for attachment of the housing to the cylindrical wall of the extraction apparatus, a threaded sleeve extending through one side wall of the housing, a threaded screw extending through said sleeve, its inner end contacting surface of said deflector means and knob means external of said housing to rotate said screw to vary the angular position of the deflector means.

12. Extraction apparatus for the removal of coarser and denser impurities and contaminants from non-metallic solid materials to upgrade the quality of the same, said apparatus comprising a first generally cylindrical vertical casing, a second generally cylindrical vertical casing of greater diameter but lesser axial depth mounted on top of said first casing, the top of said first casing being open and in communication with said second casing, an involute scroll fan housing mounted on top of said second casing; a vertical axis shaft extending centrally through said casings and fan housing and journaled for rotation therein, means to drive said shaft; a plurality of stacked closed end grinding rotor stages mounted on said shaft for rotation therewith in said first casing, a classifier rotor mounted on said shaft for rotation therewith in the upper portion of said second casing, said classifier rotor comprising an annular horizontally disposed disk and a plurality of spaced horizontally disposed radial finger-like blades uniformly distributed and extending around the periphery of said disks, the free ends of said blades being spaced closely inwardly from the inner walls of said second casing; at least one reject extraction port in the wall of said second casing disposed below the level of said classifier rotor disk, a reject spout mounted on the outside of said second casing over said port, said reject spout including a projecting housing having an opening in one end communicating with said port, a discharge conduit in communication with the outer end of said housing, a generally vertical deflector plate disposed in said port and opening, said plate extending angularly inwardly from one edge of said opening in the direction of rotation of said classifier rotor, said deflector plate being mounted for pivotal movement for variation of its angular position and having means external of the housing for movement of the deflector plate.

References Cited
UNITED STATES PATENTS

| | | | |
|---|---|---|---|
| 2,200,822 | 5/1940 | Crites | 241—58 |
| 2,206,145 | 7/1940 | Wood | 241—53 |
| 2,561,388 | 7/1951 | Lykken et al. | 241—53 X |
| 3,082,962 | 3/1963 | Parten | 241—186 X |

ANDREW R. JUHASZ, *Primary Examiner.*